United States Patent
Erickson

(10) Patent No.: US 8,220,804 B2
(45) Date of Patent: Jul. 17, 2012

(54) TOOLHOLDER ASSEMBLY WITH AXIAL CLAMPING MECHANISM

(75) Inventor: Robert A. Erickson, Raleigh, NC (US); Carla Erickson, legal representative, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 834 days.

(21) Appl. No.: 12/366,137

(22) Filed: Feb. 5, 2009

(65) Prior Publication Data

US 2010/0196113 A1    Aug. 5, 2010

(51) Int. Cl.
*B23B 31/107* (2006.01)

(52) U.S. Cl. .......... 279/2.11; 279/2.23; 82/160

(58) Field of Classification Search ........ 279/2.11, 279/2.12, 2.1, 2.23; 82/158, 160; 409/233
See application file for complete search history.

(56) References Cited

U.S. PATENT DOCUMENTS

| | | |
|---|---|---|
| 1,866,529 A | 7/1932 | Farkas |
| 3,254,567 A | 6/1966 | Daugherty |
| 3,730,637 A | 5/1973 | Cellini |
| 4,499,800 A | 2/1985 | Stahl |
| 4,691,929 A | 9/1987 | Neumaier et al. |
| 4,736,659 A | 4/1988 | Erickson |
| 4,747,735 A | 5/1988 | Erickson et al. |
| 4,836,068 A | 6/1989 | Erickson |
| 4,981,057 A | 1/1991 | von Haas et al. |
| 5,040,932 A | 8/1991 | Oshnock |
| 5,054,344 A | 10/1991 | Erickson et al. |
| 5,173,017 A | 12/1992 | Oshnock et al. |
| 5,245,896 A | 9/1993 | Erickson et al. |
| 5,279,194 A | 1/1994 | Armbrust |
| 5,415,066 A | 5/1995 | Erickson et al. |
| 5,452,631 A | 9/1995 | Erickson |
| 5,694,820 A | 12/1997 | Erickson et al. |
| 5,697,740 A * | 12/1997 | Von Haas et al. ............. 409/234 |
| 5,997,455 A * | 12/1999 | Matsuoka et al. ............. 483/56 |
| 6,000,940 A | 12/1999 | Buss et al. |
| 6,270,293 B2 | 8/2001 | Erickson et al. |
| 6,966,728 B1 | 11/2005 | Erickson |
| 7,357,608 B2 | 4/2008 | Erickson et al. |
| 7,360,974 B2 | 4/2008 | Borschert et al. |
| 7,418,783 B2 * | 9/2008 | Fujimoto et al. ............. 29/896.9 |

FOREIGN PATENT DOCUMENTS

| | | |
|---|---|---|
| GB | 278625 | 10/1927 |
| JP | 58051042 A * | 3/1983 |
| JP | 11090708 A * | 4/1999 |

* cited by examiner

*Primary Examiner* — Daniel Howell
*Assistant Examiner* — Paul M Janeski
(74) *Attorney, Agent, or Firm* — Larry R. Meenan, Esq.

(57) ABSTRACT

An apparatus for releasably holding a tubular toolholder shank by axially reciprocating a lock rod between a locked and unlocked position. Compression balls following a helical path on a torque nut are used to retract a compression sleeve, which in turn compresses springs against the lock rod to move the lock rod into the locked position. As a result, a repeatable lock rod force is possible with a pre-determined and self limiting rotation of the torque nut. The same helical groove may be used to advance the compression sleeve against the lock rod to urge the toolholder from the base member.

24 Claims, 7 Drawing Sheets

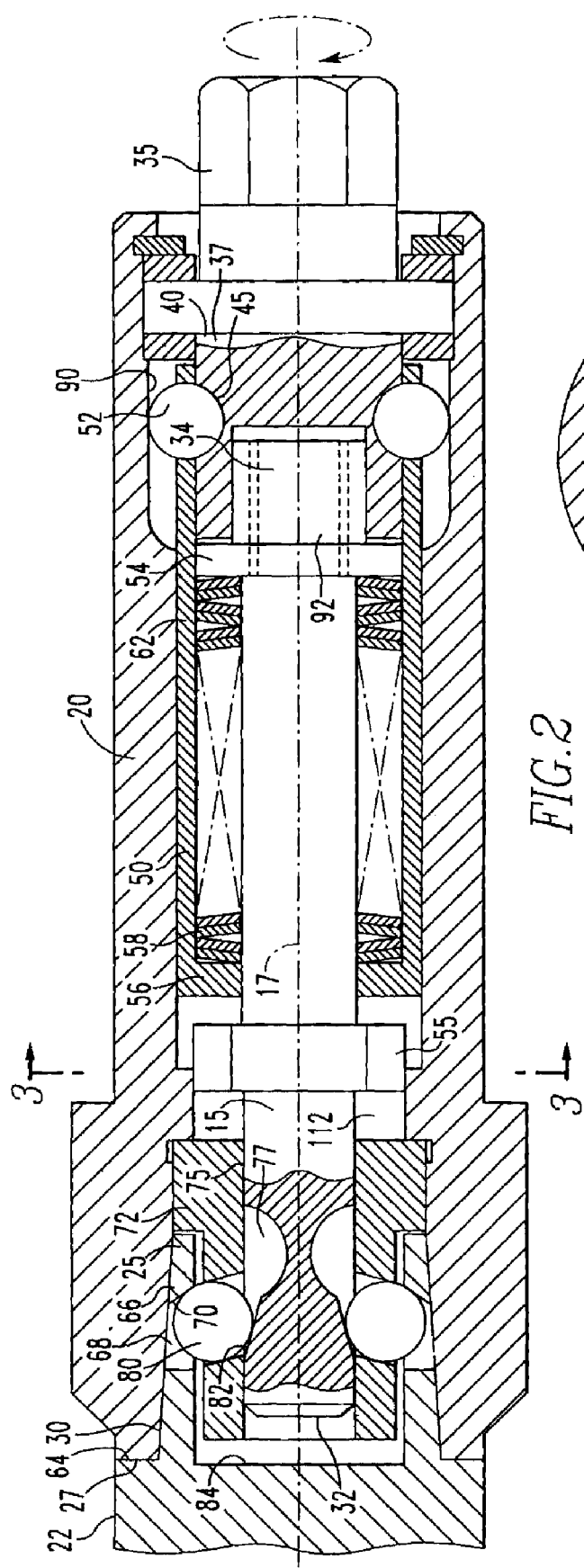
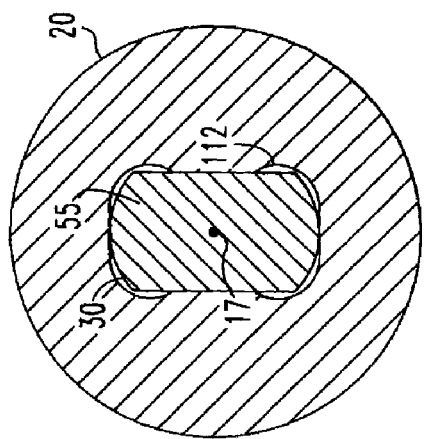
FIG.2
FIG.3

TOOLHOLDER ASSEMBLY WITH AXIAL CLAMPING MECHANISM

BACKGROUND OF THE INVENTION

1. Field of the Invention

The invention is directed to tooling for machining operations and, more particularly, directed to a toolholder assembly for precisely locating a toolholder at a selected location within the toolholder assembly during a machining operation.

2. Description of The Related Art

Minimizing the down time of a machine tool in a production environment is critical to the success of a machining facility. Historically, one major contribution to such down time was the time needed to change damaged or worn out cutting tools used by the machine tool. A cutting tool is held by a toolholder, which is typically mounted within a tool support member secured to a machine tool. When the cutting tool must be replaced, the entire toolholder with the cutting tool attached thereto is removed from the support member. A number of couplings are designed to permit quick connecting and disconnecting of the toolholder to and from the tool support member to expedite the tool changing process. One such device is described in U.S. Pat. No. 4,736,659 entitled "Toolholder Assembly for Holding a Toolholder Shank." This patent is co-owned by the Assignee of the present application and is hereby incorporated by reference. The toolholder assembly described in that patent utilizes two locking balls which are urged radially outwardly within a tool support member to engage apertures on the shank of a toolholder. While this arrangement is efficient and permits a toolholder to be removed or secured to a tool support member in a short amount of time, the design of this arrangement may limit its application to tool support members having radial access. Many industrial applications require the use of a tool support member having rear access.

U.S. Pat. No. 5,279,194 entitled "Ball Lock Assembly Without a Canister" is owned by the Assignee of the present application and is hereby incorporated by reference. While this assembly provides for rear access, actuation of the lock rod therein is achieved through multiple rotations of the torque nut and it is difficult to apply a given pull-back force.

In addition to a tool support member having rear access for actuation, a further object of the subject invention is to provide a repeatable maximum pull-back force on the lock rod with a minimum rotation of a rear end torque nut.

SUMMARY OF THE INVENTION

An apparatus for releasably holding a tubular toolholder shank has a base member with a forwardly facing surface and a bore intersecting the forwardly facing surface. The bore extends rearwardly therefrom along a longitudinal axis for receiving the toolholder shank. A lock rod with a forward and rearward end is rotationally restrained about the longitudinal axis and is movable within the base member in a rearward and forward reciprocating motion for pulling the toolholder shank rearwardly within the bore into a locked position and for releasing the toolholder shank from the bore to an unlocked position. A torque nut is rotatively mounted to the base member and operable upon the rearward end of the lock rod to provide the rearward and forward reciprocating motion of the lock rod. The torque nut has a segment with an outer surface and has one of an aperture extending within the outer surface or a groove extending at least partially around the outer surface. At least a portion of the groove is angled relative to the longitudinal axis. A compression sleeve is engaged by the torque nut through at least one compression member and resiliently engages the lock rod. The compression sleeve has the other of an aperture extending within the sleeve or a groove extending at least partially around the sleeve. The aperture is aligned with the associated groove and the at least one compression member is positioned within the groove and within the aperture, such that when the torque nut is rotated in one direction, the at least one compression member and compression sleeve are displaced axially rearward within the base and, when the torque nut is rotated in the opposite direction, the at least one compression member and compression sleeve are displaced axially forward within the base.

BRIEF DESCRIPTION OF THE DRAWINGS

The above, as well as other features and advantages of the invention, will become apparent upon consideration of the detailed descriptions in connection with the several drawings in which:

FIG. 2 is a cross-sectional view of the toolholder assembly, whereby the lock rod is in the locked position and the toolholder is secured within the base member;

FIG. 3 is cross-sectional view along lines 3-3 in FIG. 1, illustrating the manner by which the lock rod is rotationally restrained within the base member;

DESCRIPTION OF THE INVENTION

Figure 1:
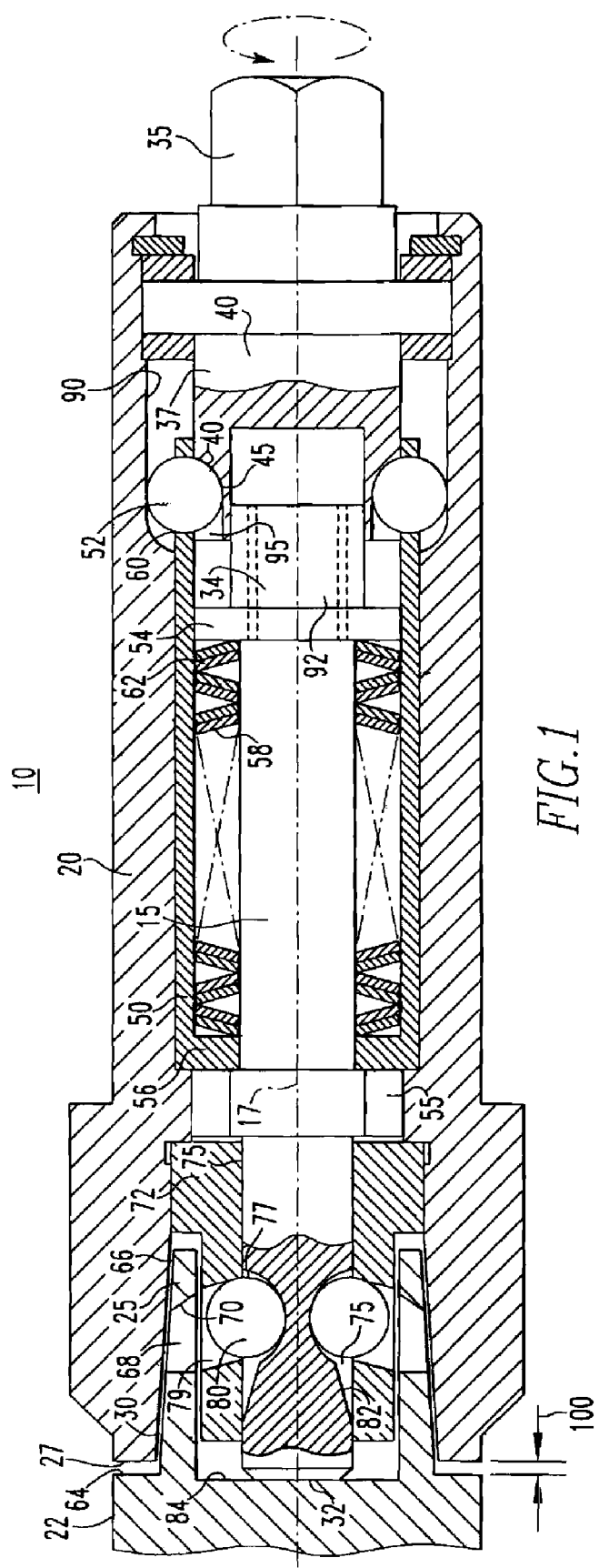
FIG. 1 is a cross-sectional view of the toolholder assembly in accordance with the subject invention, whereby the lock rod is in the released position and the toolholder is not secured within the base member.

Directing attention to FIG. 1, the goal of the toolholder assembly 10 is to move a lock rod 15 back and forth along a longitudinal axis 17 within a base member 20 to secure a toolholder 22 within the base member 20 (FIG. 2) or to eject the toolholder 22 from the base member 20 (FIG. 1).

The base member 20 has a forwardly facing surface 27 and a bore 30 intersecting with the forwardly facing surface 27 and extending rearwardly therefrom along the longitudinal axis 17 for receiving the toolholder shank 25 of the toolholder 22. As illustrated in FIG. 1, the toolholder shank 25 may freely move in and out of the bore 30.

The lock rod 15 has a forward end 32 and a rearward end 34. As will be explained in the discussion of FIG. 3, the lock rod is rotationally restrained about the longitudinal axis 17. The lock rod 15 is movable within the base member 20 in a rearward and forward reciprocating motion for pulling the toolholder shank 25 rearwardly within the bore 30 into the locked position, as illustrated in FIG. 2, and for releasing the toolholder shank 25 from the bore 30 to the unlocked position illustrated in FIG. 1.

A torque nut 35 is rotatively mounted to the base member 20 and operable upon the rearward end 34 of the lock rod 15 to provide the rearward and forward reciprocating motion of the lock rod 15. The torque nut 35 has a segment 37 with an outer surface 40. A groove 45 (FIG. 4) extends at least partially around the outer surface 40 and, wherein, at least a portion of the groove 45 is angled relative to a line 47 perpendicular to the longitudinal axis 17 to form an angle a. A compression sleeve 50 is engaged by the torque nut through at least one compression member 52. Additionally, the compression sleeve 50 resiliently engages the lock rod 15 (FIG. 1). In particular, the lock rod 15 has a pull-back shoulder 54 extending radially outward, while the compression sleeve 50 has a shoulder 56 extending radially inward, and the opposing faces of the lock rod shoulder 54 and compression sleeve shoulder 56 capture and compress a set of springs 58 positioned about the lock rod 15. The springs 58 may be Belleville washers, as illustrated. The compression sleeve 50 has an aperture 60 extending therethrough to accommodate the compression member 52 which, as illustrated, is a ball. It should be noted that there are two compression members 52, illustrated in FIG. 1 and FIG. 2, and each has an associated groove 45. However, only one compression member 52 and groove 45 set will be discussed, with the understanding that the other set is similar.

Figure 4:
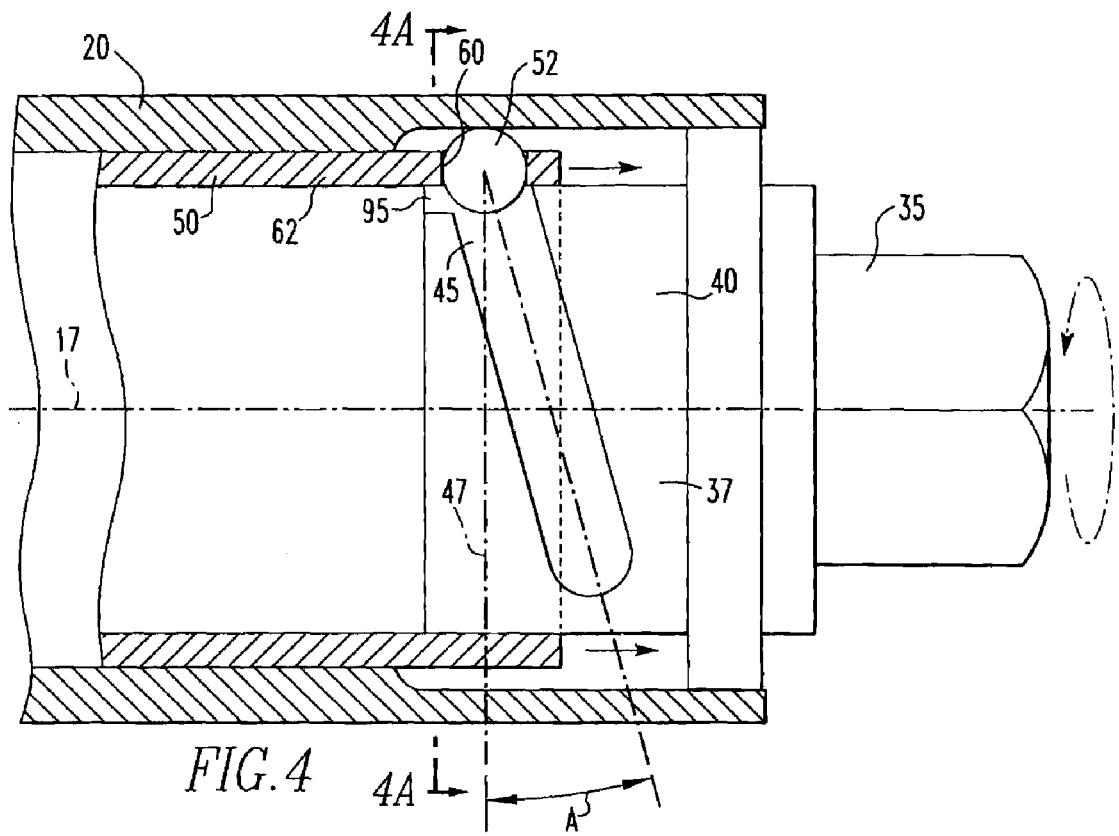
FIG. 4 is a schematic of the relationship between the torque nut compression ball and compression sleeve illustrating a straight helical groove on the outer surface of the torque nut and its relationship with the compression ball and compression sleeve, wherein the compression sleeve is illustrated in the released position.
Figure 5:
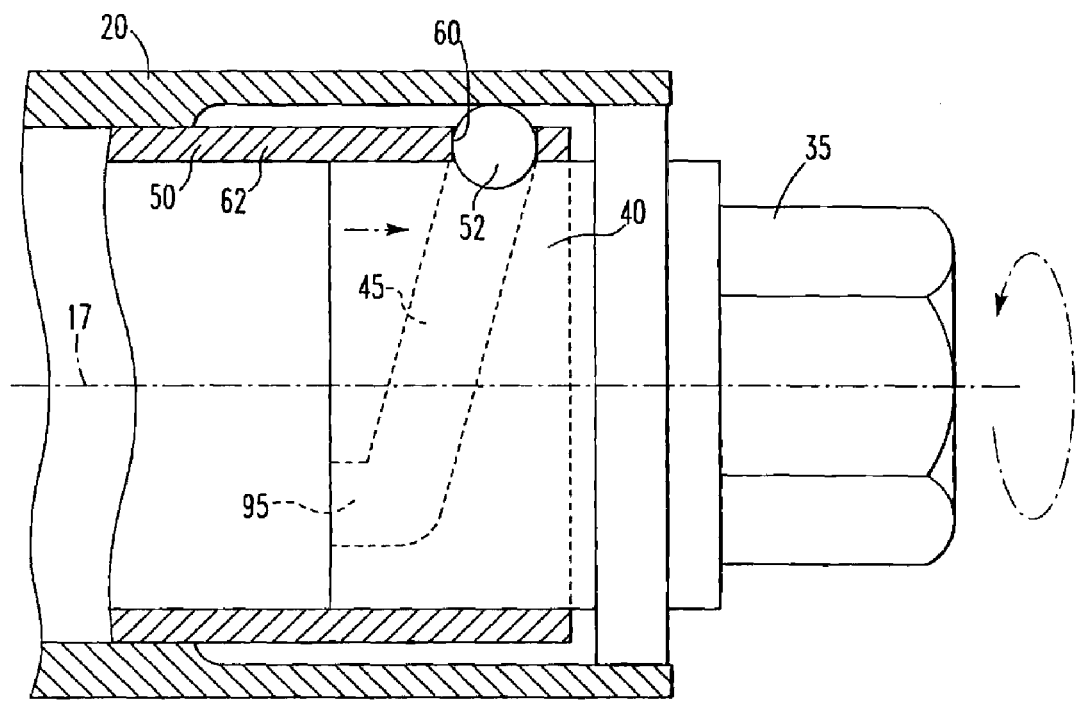
FIG. 5 is a sketch similar to that illustrated in FIG. 4, however, now the torque nut is rotated such that the compression sleeve is in the locked position.

When the aperture 60 (FIG. 1 and FIG. 4) is aligned with the associated groove 45 and the compression member 52 is positioned within both the groove 45 and the aperture 60 (FIG. 1 and FIG. 4), then, when the torque nut 35 is rotated in one direction, the compression member 52 and the compression sleeve 50 are displaced axially forward within the base member 20, as illustrated in FIG. 1, and when the torque nut 35 is rotated in the opposite direction, the compression member 52 and the compression sleeve 50 are displaced axially rearward within the base 20, as illustrated in FIG. 2 and FIG. 5.

As illustrated in FIGS. 4 and 5, the groove 45 is in the outer surface 40 of the torque nut 35 and the aperture 60 extends through the wall 62 of the compression sleeve 50.

Figure 6:
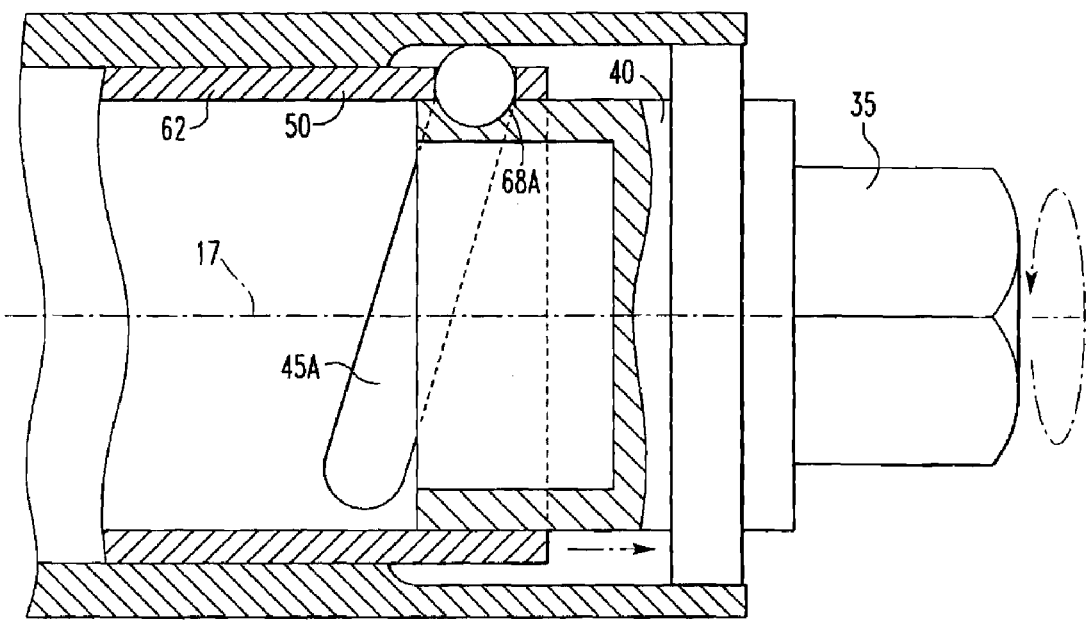
FIG. 6 is a sketch illustrating the groove in the compression sleeve and the compression ball in a aperture in the outer surface of the torque nut, whereby, once again, the compression sleeve is in the released position.
Figure 7:
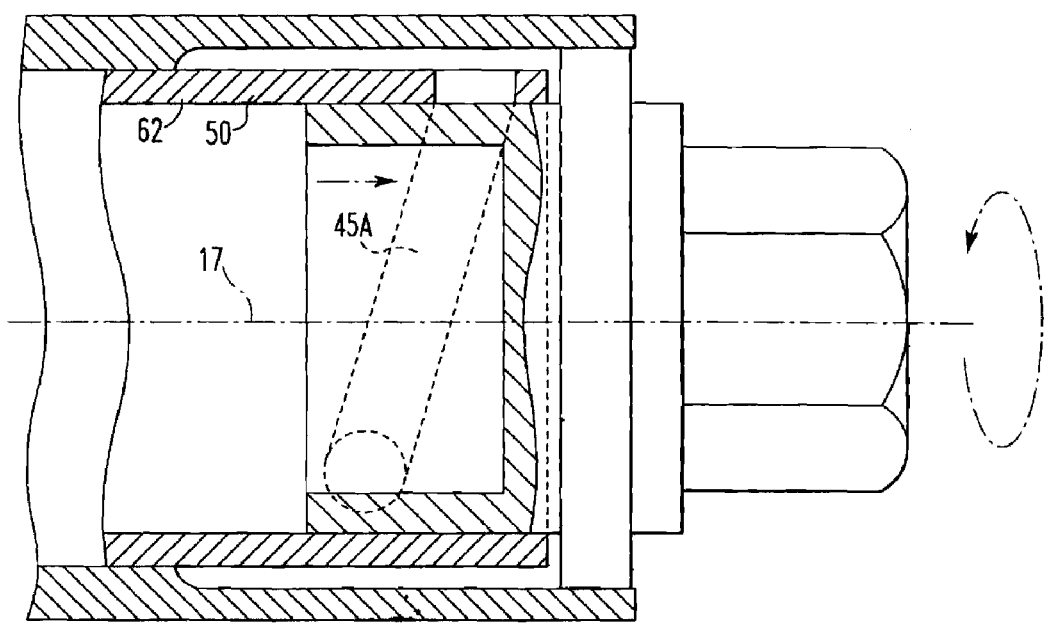
FIG. 7 illustrates a sketch similar to that in FIG. 6, however, now with the torque nut rotated such that the compression sleeve is in the locked position.

As illustrated in an alternative embodiment, in FIGS. 6 and 7, it is entirely possible for the aperture 60A to exist within the outer surface 40 of the torque nut 35, while the groove 45A extends within the wall 62 of the compression sleeve 50.

The purpose of this toolholder assembly 10 is to secure the toolholder 22 within the base member 20. Although the manner by which the lock rod 15 engages the toolholder 22 is not the focus of the subject invention, this mechanism will be described to assist in understanding the overall operation of the toolholder assembly 10, with the understanding that this portion of the toolholder assembly may be modified to accommodate other toolholders.

Directing attention to FIG. 1, the toolholder 22 has a rearwardly facing abutment surface 64 and the toolholder shank 25 is tubular with a shank wall 66 extending rearwardly from the toolholder 22. Within the shank wall 66 are spaced perforations 68 and within the spaced perforations 68 may be forwardly facing concave contact surfaces 70.

The toolholder assembly 10 illustrated in FIG. 1 is typical of a toolholder used for non-rotating tooling such as a lathe. However, it should be understood that the toolholder assembly 10 may have attached to it any one of a variety of tools that may be associated with either non-rotating or rotating applications.

As previously mentioned, the base member 20 has a forwardly facing surface 27 and a bore 30. Within the bore 30, extending through the base member 20, is a stub 72 which extends into the bore 30 of the base member 20. A stub bore 75 extends longitudinally through the stub 72 and the lock rod 15 is slideably mounted within the stub bore 75.

Toward the forward end 32 of the lock rod 15 are depressions 77 which may be aligned with radial apertures 79 extending through the stub 72 into the stub bore 75. When the lock rod 15 is moved to the right, locking elements 80 positioned within the apertures 79 of the sub 72 and within the depressions 77 of the lock rod 15 are urged radially outwardly.

FIG. 1 shows the toolholder 22 removed from the base member 20. To secure the toolholder 22 within the base 20, the lock rod 15 must be positioned such that the locking elements 80 are within the depressions 77 and recessed within the radial apertures 79. In this orientation, the locking elements 80 are clear of the perforations 68 within the shank 25 of the toolholder 22 and, therefore, the tubular shank 25 of the toolholder may be inserted into the bore 30.

As shown in FIG. 2, with the toolholder 22 positioned within the bore 30, the lock rod 15 may be pulled to the right, away from the toolholder 22, such that the locking elements 80 are displaced radially outwardly from the depression 77 onto ramps 82, thereby causing the locking elements 80 to penetrate the perforations 68 and contact the forwardly facing concave contact surface 70 of the toolholder shank 25. When the lock rod 15 is retracted to the right, the toolholder 22 is urged within the base member 20 and the rearwardly facing abutment face 64 of the toolholder 22 contacts the forwardly facing abutment surface 27 of the base member 20. This action of the lock rod 15 secures the toolholder 22 within the base member 20.

To release the toolholder 22 from the base member 20, the lock rod 15 is urged to the left toward the toolholder 22. In such a manner, the locking elements 80 are urged within the radial apertures 79 and depressions 77 so that adequate clearance is provided and the toolholder 22 may be removed from the base member 20 as shown in FIG. 1.

When the toolholder 22 is locked within the base member 20, there may exist elastic deformation of the base member 20, thereby creating high frictional forces retaining the toolholder 22 within the base member 20. To release the toolholder 22, the lock rod 15 is extended at the forward end of the base member 20 such that the lock rod 15 protrudes beyond the stub 72 (FIG. 5) and contacts an impact area 84, thereby ejecting the toolholder 22 from the base member 20. Therefore, by moving the lock rod 15, the toolholder 22 may be secured or released within the base member 20, thereby providing for quick change of the toolholder 22.

As mentioned, this mechanism for securing the toolholder 22 within the base member 20 is not part of the subject invention, but is described only to enhance the understanding of the operation of the subject invention. It should be appreciated that the subject invention may be applied to toolholders and lock rods having different geometries than that described herein.

The invention is directed to the mechanism of reciprocating the lock rod 15 by using a predetermined rotation of the torque nut 35 to pull the lock rod 15 back with a repeatable force and, furthermore, to rotate the torque nut 35 in the opposite direction to advance the lock rod 15 to bump off the toolholder 22 from the base member 20.

Directing attention to FIGS. 1 and 2, the mechanics for securing the toolholder 22 within the base member 20 will be described. Beginning in the arrangement illustrated in FIG. 1, whereby the locking elements 80 are recessed within the depressions 77 and the toolholder 22 is free to move in and out of the base member bore 30, the torque nut 35 is rotated in, for example, a clockwise fashion. The compression members 52 are positioned within the apertures 60 of the compression sleeve 50. Furthermore, the compression members 52 are captured between the inner wall 90 of the base member 20 and the groove 45 on the outer surface 40 of the torque nut 35. As illustrated in FIGS. 4 and 5, the groove 45 has a helical configuration such that, when the torque nut 35 is rotated, the compression member 52 follows the groove and is moved from left to right. Because the compression member 52 is captured within the aperture 60 of the compression sleeve 50, as the compression member 52 moves from left to right, so does the compression sleeve 50. The shoulder 56 (FIG. 1) of the compression sleeve 50 compresses the springs 58 against the shoulder 54 of the lock rod 15, thereby urging the lock rod 15 from the left to the right, as illustrated in FIG. 2. As a note, the lock rod shoulder 54 is part of an end cap 92 that may be threadably secured to the end 34 of the lock rod 15. As the compression sleeve 50 moves further to the right, the springs 58 continue to apply a force to the shoulder 54 of the lock rod 15 and move the lock rod further to the right. The motion of the compression member 52 within the groove 45 is illustrated in FIGS. 4 and 5, wherein FIG. 4 illustrates the compression member 52 in its forward most position corresponding with the arrangement in FIG. 1, while FIG. 5 illustrates the compression member 52 in its rearward most position consistent with the arrangement illustrated in FIG. 2. There is a breakout section 95 illustrated in FIGS. 4 and 5, and this is a non-functional portion that is intended only for manufacturing to permit an end mill to enter the outer surface 40 of the torque nut 35 and to machine the groove 45. This breakout section 95 is also illustrated in FIG. 1.

Figure 4A:
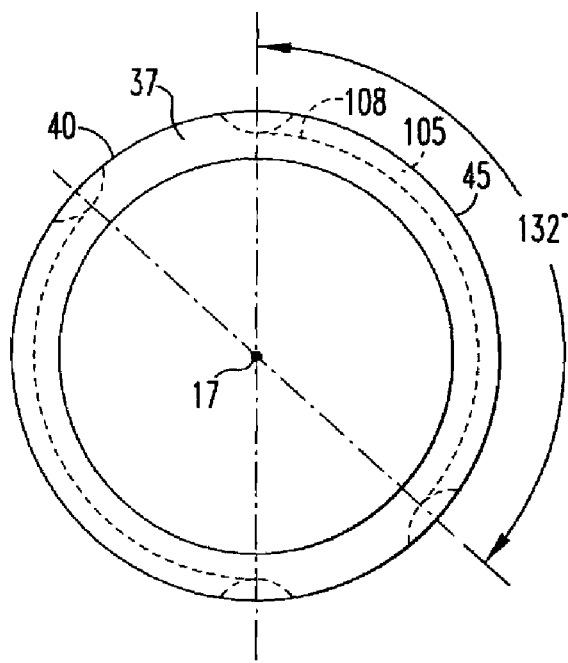
FIG. 4A is a cross-sectional view of the schematic of FIG. 4 viewed along arrows "4-4"
Figure 8A:
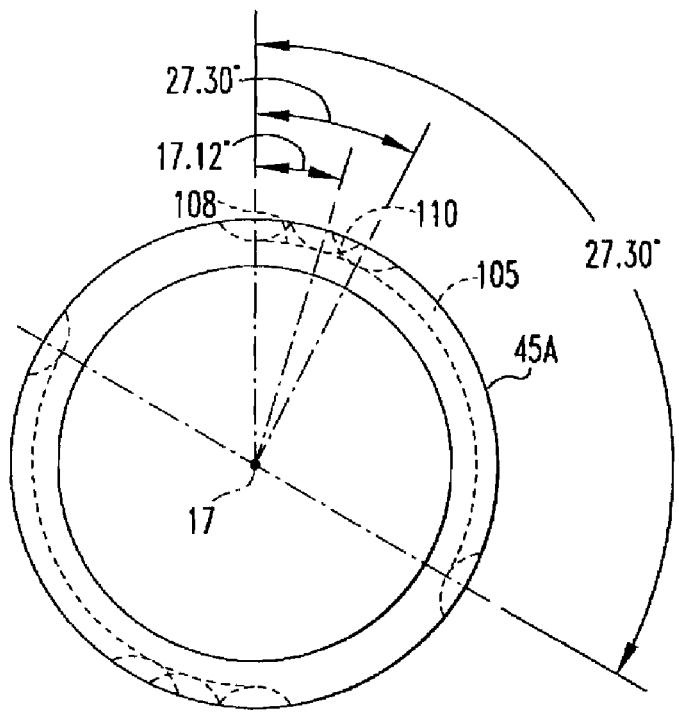
FIG. 8A is a cross-sectional view of the schematic of FIG. 8 viewed along arrows "8-8"

Redirecting attention to FIG. 4, at least a portion of the groove 45 is angled with respect to a line 47, perpendicular to the longitudinal axis 17 and it is this angular orientation coupled with rotation of the torque nut 35 that causes the compression member 52 to move the compression sleeve 50 along the longitudinal axis 17. As illustrated in FIG. 4, the groove 45 may be helical with respect to the longitudinal axis 17. It is of particular note that the entire range of travel for the compression member 52, from the forward most position illustrated in FIG. 1, to the rearward most position illustrated in FIG. 2, is achieved by rotation of the torque nut 35 in an amount less than 180 degrees about the longitudinal axis 17. In particular, directing attention to FIG. 4A, which is a sectional view of the torque nut segment 37 along lines 4A-4A in FIG. 4, the compression member 52 may be moved between the two ends of the groove 45 with a rotation of the torque nut 35 of 132 degrees. Not only does this provide a predetermined range of rotation of the torque nut 35 to engage or disengage the toolholder 22, but furthermore, the pull-back force applied to the lock rod 15 is predetermined and is repeatable This occurs because the springs 58 are compressed by the longitudinal travel of the compression sleeve 50, which itself is limited by the travel of the compression member 52 within the groove 45.

Directing attention to FIG. 4, a single groove 45 is used to move the compression member 52 to the left or to the right. The groove 45 illustrated in FIG. 4 forms an angle A with the line 47 perpendicular to the longitudinal axis of between 12 and 22 degrees and preferably forms angle A of approximately 17 degrees. The determination of this angle is based upon the desired compression provided by the compression members 52 upon the lock rod 15 and the desired torque that must be imparted to the torque nut 35 to achieve such a compression. In the arrangement illustrated in FIG. 4, the same angle A is used to pull back the lock rod 15 and to move the lock rod from right to left, and, as will be discussed, to bump off the toolholder 15 from the base member 20.

For purposes of discussion, when the compression member 52 follows the groove 45 to move the compression sleeve 50 to the right, the angle A of the groove 45 will define a pull-back pitch. When the compression member 52 follows the groove 45 and moves the compression sleeve 50 from right to left, the angle A will define a bump-off pitch. As will be discussed with respect to the angle of the groove 45, the force needed to bump off the toolholder 22 from the base member 20 may be greater than the force required to pull back the lock rod 15 to lock the toolholder 22 within the base member 20.

Directing attention again to FIGS. 1 and 2, the lock rod 15 has a range of motion along the longitudinal axis 17 including a bump-off region 100 defined by the area where the forward end 32 of the lock rod 15 (FIG. 1) occupies a portion of the same space as the toolholder 22 would occupy in the locked position (FIG. 2). As a result, with the toolholder 22 in the locked position within the base member 20, the lock rod 15 may be advanced to the left (FIG. 1) to contact the impact area 84 of the toolholder to forcibly push the toolholder 22 from the base member 20. As illustrated in FIG. 4, since the groove has a constant angle A, the pull-back pitch of the groove 45 is identical to the bump-off pitch of the groove. The groove 45 extends around the cylindrical outer surface 40 of the torque nut 35 and, as a result, the angle A actually defines a helical angle about the outer surface 40.

It should be appreciated that the bump-off region 100 (FIG. 1) is relatively small and, therefore, the motion of the lock rod 15 to eject the toolholder 22 from the base member 20 may also be relatively small. However, depending upon the force of the resilient interference fit with which the toolholder 32 is mounted within the base member 20, the force required to eject the toolholder 22 may be greater. As a result, while the same groove angle A used for the pull-back section to retain the lock rod 15 within the base member 20 may be used in the opposite direction to eject the toolholder 22, it may be preferable to change the groove angle A in the bump-off region 100.

Figure 8:
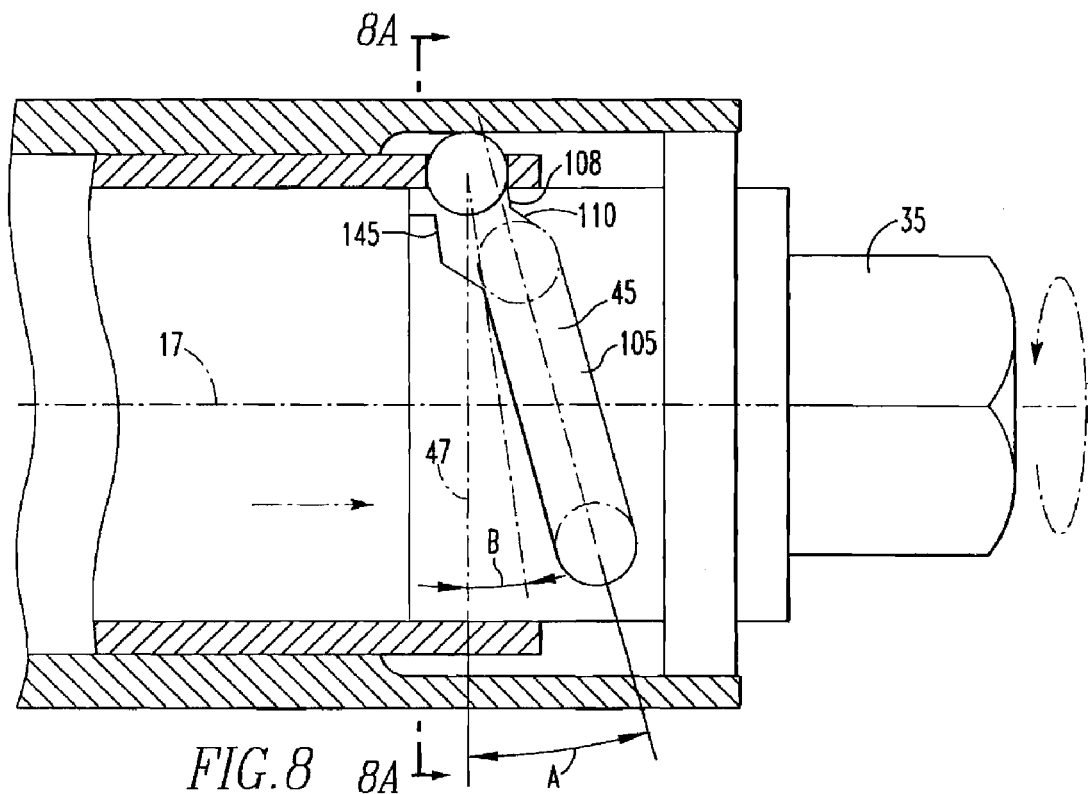
FIG. 8 illustrates a sketch similar to that of FIG. 4, however, the groove on the outer surface of the torque nut now includes segments of different orientations to assist in releasing the toolholder from the base member, wherein the compression sleeve is illustrated in the released position.
Figure 9:
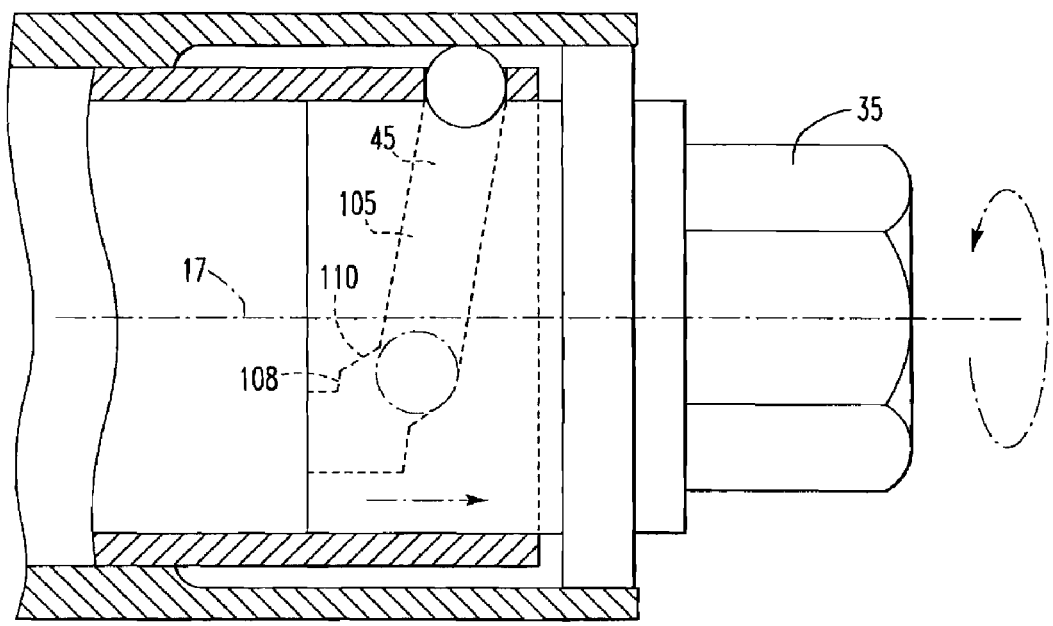
FIG. 9 is a sketch similar to that of FIG. 8, however, now the torque nut has been rotated such that the compression sleeve is in the locked position.

FIGS. 8 and 9 illustrate a groove 45 having a pull-back section 105 and a bump-off section 108 with a transition section 110, therebetween. As previously discussed, the pull-back section 105 is generally helical and forms and angle A with a line 47 perpendicular to the longitudinal axis 17. However, for the bump-off section 108, it is desirable to produce a greater longitudinal force for a given rotation of the torque nut 35 and, as a result, the bump-off section 108 extends along a groove 145 whose center line forms an angle B relative to the line perpendicular to the longitudinal axis 17 of between 5 and 15 degrees and preferably, 10 degrees. By providing a smaller angle, then, for the same torque applied to the torque nut 35, a greater longitudinal force is generated to eject the toolholder 22 from the base member 20.

Directing attention to FIG. 2, it should be appreciated that the torque applied to the torque nut 35 should extend the locking elements 80 radially outward to fully engage the toolholder 22. On the other hand, to release the toolholder 22, the torque nut 35 is rotated in the opposite direction and once the locking elements 80 begin to fall within the depressions 77, the force to move the lock rod 15 to the left is minimal until the forward end 32 of the lock rod 15 encounters the impact area 84 of the toolholder 22. At that point, the lock rod 15 must apply a greater force to the impact area 84 of the toolholder 22 to bump off the toolholder 22 from the base member 20. However, between the release of the compression members 52 and the bump-off, the forces that must be applied to the lock rod 15 are minimal. As a result, the transition segment 110 (FIG. 8) of groove 45 may have a fairly aggressive angle to advance the lock rod 15 a larger distance for a given rotation. Nevertheless, once the compression member 52 advances the lock rod 15 far enough to contact the impact area 84, then the smaller angle B associated with the bump-off section 108 will permit the application of the same torque to produce a greater longitudinal force to enhance bumping off the toolholder 22. The bump-off section (108) has a bump-off pitch with an angle B relative to a line 47 perpendicular to the longitudinal axis of between 12 and 22 degrees and preferably 17 degrees.

Figure 10:
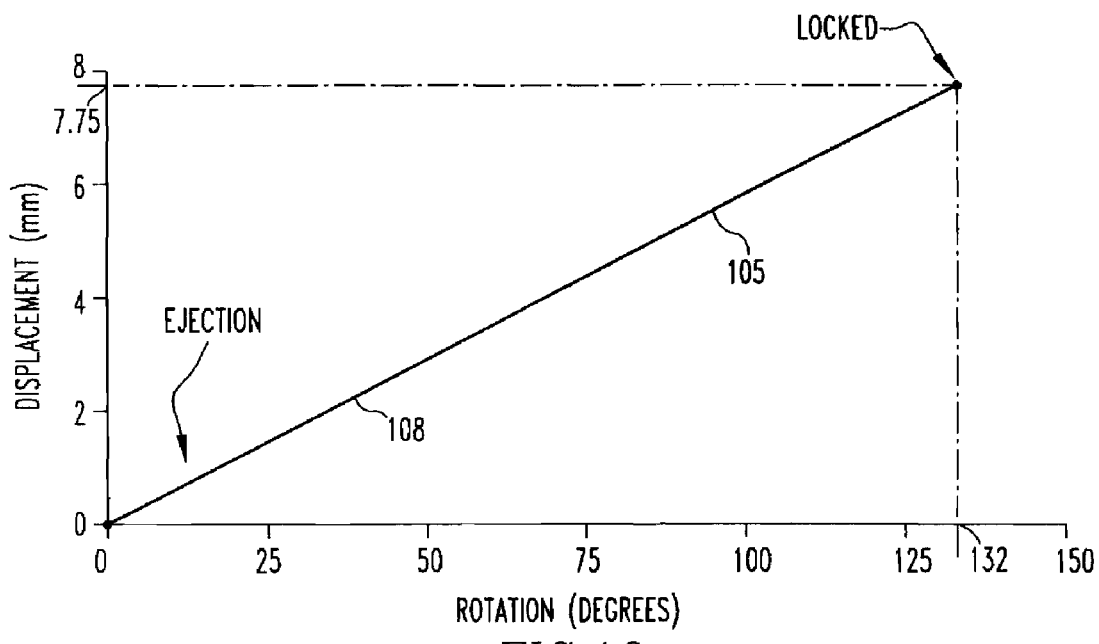
FIG. 10 is a graph of displacement vs. rotation for the arrangements illustrated in FIGS. 4 and 5 and FIGS. 6 and 7.
Figure 11:
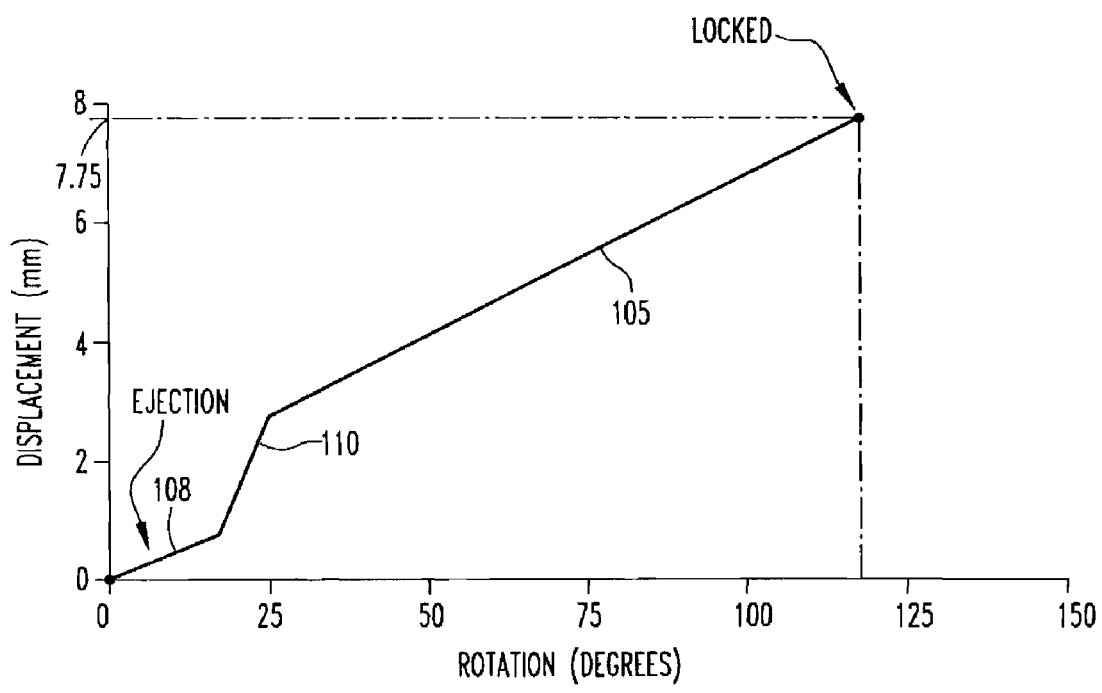
FIG. 11 is a graph of a displacement vs. rotation representative of the displacement vs. rotation for the arrangement illustrated in FIGS. 8 and 9.

FIGS. 10 and 11 illustrate different displacements of the lock rod 15 for the same rotation of the torque nut 35. In particular, the constant angle A in FIG. 4 will produce a displacement of the lock rod 15 similar to that illustrated in FIG. 10. When the torque nut 35 is at the "unlocked" position (FIGS. 1 and 4), there is no displacement of the lock rod 15 as shown at the "0-0" coordinate in FIG. 10. As the torque nut 35 is rotated, the lock rod 15 is displaced in a linear fashion until the rotation is limited by the groove 45 design. As shown in FIG. 10, the torque nut 35 rotation is limited to 132 degrees.

However, as previously mentioned, the bump-off region may require forces higher than those needed to lock the toolholder 22 within the base member 20. The graph in FIG. 11 represents the displacement of the lock rod 15 when the groove 45 illustrated in FIG. 8 is utilized. Moving from the upper right of the graph in FIG. 11, which represents the "locked" position, as the torque nut 35 is rotated from the locked position, the locking element 80 travels along the pull-back section 105 and enters the transition segment 110 and then the bump-off section 108. Here the angle of the groove 45 changes such that, for the same torque nut 35 rotation, the lock rod 15 is displaced a smaller amount. This produces a "wedging" effect providing a greater longitudinal force suitable to more easily eject the toolholder 22 from the base member 20. It should be noted that the composite arrangement of the pull-back section 105, transition segment 110 and the bump-off section 108, represented in FIG. 11, permits the lock rod 15 to travel its entire range with a rotation that is less than the rotation required for the "straight" groove 45, represented by FIG. 10.

While discussed herein are helical angles that are constant, it should be appreciated that other non-helical grooves may be utilized to improve the efficiency of the torque nut 35 rotation for different lock rod 15 configurations.

Unlike the pull-back sequence where the shoulder 56 (FIG. 2) of the compression sleeve 50 engages the springs 58 to act against the shoulder 54 of the lock rod 15, causing the lock rod 15 to move to the right, during the bump-off sequence, the compression sleeve 50 (FIG. 1) is moved to the left and encounters the lock rod bump-off shoulder 55 and urges the bump-off shoulder 55 to the left, which in turn urges the lock rod 15 to the left to eject the toolholder. FIG. 2 illustrates the bump-off shoulder 55 with the lock rod 15 in the locked position, while FIG. 1 illustrates the bump-off shoulder 55 contacted by the compression sleeve 50 and urged to the left so that the forward end 32 of the lock rod 15 contacts the impact area 84 and ejects the toolholder 22.

The lock rod 15 illustrated herein is designed to be held non-rotatable about the longitudinal axis 17. FIG. 3 illustrates a cross-sectional view of the base member 20 along lines "3-3" in FIG. 2. Of particular note, the lock rod bump-off shoulder 55 is non-circular and fits within a non-circular passageway 112 within the bore 30 of the base member 20. Through this mechanism, the lock rod is rotationally restrained about but movable along the longitudinal axis 17.

It should be noted that the toolholder assembly 10 is activated by the torque nut 35 from the rearward end of the base member 20. Furthermore, the torque nut 35 may have a hexagonal end, such that it may be accessible using commercially available tools. In order to maximize the efficiency of the spring compression, the springs 58 may be pre-loaded between the pull-back shoulder 54 of the lock rod 15 and the shoulder 56 of the compression sleeve 50.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. An apparatus for releasably holding a tubular toolholder shank, comprising:
    a) a base member having a forwardly facing surface and a bore intersecting the forwardly facing surface and, wherein the bore extends rearwardly therefrom along a longitudinal axis for receiving the toolholder shank;
    b) a lock rod with a forward and rearward end, wherein the lock rod is rotationally restrained about the longitudinal axis and is movable within the base member in a rearward and forward reciprocating motion for pulling the toolholder shank rearwardly within the bore into a locked position and for releasing the toolholder shank from the bore to an unlocked position;
    c) a torque nut rotatively mounted to the base member and operable upon the rearward end of the lock rod to provide the rearward and forward reciprocating motion of the lock rod, wherein the torque nut has a segment with an outer surface and has one of an aperture extending within the outer surface or a groove extending at least partially around the outer surface and, wherein at least a portion of the groove is angled relative to the longitudinal axis;
    d) a compression sleeve engaged by the torque nut through at least one compression member and further resiliently engaging the lock rod, wherein the compression sleeve has the other of an aperture extending within the sleeve or a groove extending at least partially around the sleeve;
    e) wherein the aperture is aligned with the associated groove and the at least one compression member is positioned within the groove and within the aperture, such that when the torque nut is rotated in one direction, the at least one compression member and compression sleeve are displaced axially rearward within the base and, when the torque nut is rotated in the opposite direction, the at least one compression member and compression sleeve are displaced axially forward within the base.

2. The apparatus according to claim 1, wherein the groove is in the outer surface of the torque nut and the aperture extends through the wall of the compression sleeve.

3. The apparatus according to claim 1, wherein the groove is in the wall of the compression sleeve and the aperture is in the outer surface of the torque nut segment.

4. The apparatus according to claim 1, wherein at least a portion of the groove is angled with respect to the longitudinal axis such that rotation of the torque nut causes the compression member to urge the compression sleeve along the longitudinal axis.

5. The apparatus according to claim 4, wherein at least a portion of the groove is helical with respect to the longitudinal axis.

6. The apparatus according to claim 4, wherein the groove extends less than 360 degrees with respect to a radial line extending from the longitudinal axis.

7. The apparatus according to claim 6, wherein the groove extends approximately 140 degrees, thereby limiting the rotation of the torque nut.

8. The apparatus according to claim 4, wherein at least a portion of the groove identifies a pull-back section.

9. The apparatus according to claim 8, wherein the pull-back section extends over the entire groove.

10. The apparatus according to claim 8, wherein the pull-back section has a pull-back pitch with an angle relative a line perpendicular to the longitudinal axis of between 12-22 degrees.

11. The apparatus according to claim 10, wherein the pull-back pitch forms an angle of approximately 17 degrees.

12. The apparatus according to claim 8, wherein the lock rod has a range of motion including a bump-off region defined by the region, wherein the forward position the lock rod occupies a portion of the same space as a toolholder would occupy in the locked position.

13. The apparatus according to claim 12, wherein the groove in the bump-off region has a bump-off pitch for moving the lock rod forward within the bump-off region.

14. The apparatus according to claim 13, wherein the bump-off pitch is less than the pull-back pitch.

15. The apparatus according to claim 13, wherein the bump-off pitch forms an angle with a line perpendicular with the longitudinal axis of between 5 and 15 degrees.

16. The apparatus according to claim 15, wherein the bump-off pitch angle is approximately 10 degrees.

17. The apparatus according to claim 1, further including a toolholder within the bore such that the lock rod in the rearward position does not directly contact the toolholder and the lock rod in the forward position directly contacts the toolholder.

18. The apparatus according to claim 1, wherein the resilient engagement of the lock rod by the compression sleeve is provided by at least one spring.

19. The apparatus according to claim 18, wherein the at least one spring is captured between a shoulder extending radially outward from the lock rod and a shoulder extending radially inward from the compression sleeve.

20. The apparatus according to claim 18, wherein the at least one spring associated with the compression sleeve and the lock rod is pre-loaded.

21. The apparatus according to claim 1, wherein the compression members are balls.

22. The apparatus according to claim 1, wherein the torque nut is accessible from the rearward end of the base.

23. The apparatus according to claim 22, wherein the torque nut has a hexagonal end.

24. The apparatus according to claim 1, wherein the lock rod has a longitudinally extending non-circular section that is slidingly engaged with a longitudinally extending non-circular section of the bore within the base, such that the lock rod may move longitudinally but is rotationally restrained within the base.

* * * * *